(12) United States Patent
Al-Kofahi et al.

(10) Patent No.: US 12,205,362 B2
(45) Date of Patent: *Jan. 21, 2025

(54) SYSTEMS AND METHODS FOR IMAGE CLASSIFICATION

(71) Applicant: Molecular Devices, LLC, San Jose, CA (US)

(72) Inventors: Yousef Al-Kofahi, San Jose, CA (US); Michael MacDonald, San Jose, CA (US); Asha Singanamalli, San Jose, CA (US); Mohammed Yousefhussien, San Jose, CA (US); Will Marshall, San Jose, CA (US)

(73) Assignee: Molecular Devices, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,823

(22) Filed: Sep. 20, 2023

(65) Prior Publication Data

US 2024/0161486 A1     May 16, 2024

Related U.S. Application Data

(63) Continuation of application No. 17/216,746, filed on Mar. 30, 2021, now Pat. No. 11,798,270.

(60) Provisional application No. 63/016,075, filed on Apr. 27, 2020.

(51) Int. Cl.
*G06V 10/82*     (2022.01)
*G06F 18/2411*     (2023.01)
*G06F 18/2413*     (2023.01)
*G06T 7/11*     (2017.01)
*G06V 10/764*     (2022.01)
*G06V 10/776*     (2022.01)
*G06V 10/94*     (2022.01)

(52) U.S. Cl.
CPC .......... *G06V 10/82* (2022.01); *G06F 18/2411* (2023.01); *G06F 18/2413* (2023.01); *G06T 7/11* (2017.01); *G06V 10/764* (2022.01); *G06V 10/776* (2022.01); *G06V 10/945* (2022.01)

(58) Field of Classification Search
None
See application file for complete search history.

(56) References Cited

U.S. PATENT DOCUMENTS 3,488,934 A * 1/1970 MacDonald .............. A46D 1/00
57/282
6,400,831 B2 * 6/2002 Lee .......................... G06T 7/215
348/169

(Continued)

*Primary Examiner* — Soo Shin
(74) *Attorney, Agent, or Firm* — Merchant & Gould P.C.

(57) ABSTRACT

In one aspect, a method for inspecting features of an image using an image inspection controller that includes a processor communicatively coupled to a memory is described. The method includes receiving, at the processor, an input image, performing, on the input image, one of a semantic segmentation process and an object classification process to generate an output image, and prompting a user to select between approving the displayed output image, and at least one of i) performing an additional semantic segmentation process on the displayed output image, and ii) performing an additional object classification process on the displayed output image.

20 Claims, 8 Drawing Sheets

(56) References Cited

U.S. PATENT DOCUMENTS

| | | | |
|---|---|---|---|
| 6,711,278 B1* | 3/2004 | Gu | G06V 10/24 |
| | | | 375/E7.193 |
| 10,169,680 B1* | 1/2019 | Sachdeva | G06F 3/04842 |
| 10,489,430 B1* | 11/2019 | Rogynskyy | G06F 16/2477 |
| 10,878,219 B2* | 12/2020 | Zhou | G06F 18/285 |
| 11,798,270 B2* | 10/2023 | Al-Kofahi | G06N 3/08 |
| 2002/0016784 A1* | 2/2002 | Bergan | G06N 5/02 |
| | | | 706/20 |
| 2011/0026836 A1* | 2/2011 | Ptucha | G06T 11/60 |
| | | | 382/209 |
| 2020/0082198 A1* | 3/2020 | Yao | G06F 18/24143 |
| 2020/0085382 A1* | 3/2020 | Taerum | G06T 7/0016 |
| 2020/0210721 A1* | 7/2020 | Goel | G06F 18/24 |
| 2020/0302612 A1* | 9/2020 | Marrero | G06T 7/12 |
| 2020/0349711 A1* | 11/2020 | Duke | G06F 18/2431 |
| 2021/0279957 A1* | 9/2021 | Eder | G06T 7/80 |

\* cited by examiner

SYSTEMS AND METHODS FOR IMAGE CLASSIFICATION

CROSS REFERENCE TO RELATED APPLICATIONS

This application is a continuation of U.S. patent application Ser. No. 17/216,746, filed Mar. 30, 2021, which claims the benefit of U.S. Provisional Application No. 63/016,075, filed Apr. 27, 2020, the entire disclosures of which are incorporated herein by reference in their entireties.

BACKGROUND

The field of the invention relates generally to systems and methods for image classification, and more specifically to systems and methods for seamlessly integrating image classification processes.

At least some known methods of image inspection implement, for example, pixel-level classification and/or object-level classification. Pixel-level classification is generally known for producing outputs based on the intensity or texture of an object, while object-level classification is generally known for producing outputs based on the geometry of objects. Some known methods only utilize one of either pixel-level classification or object-level classification, producing an output image that is less than desirable due to a lack of detail in the output image. Further, current systems and methods that offer more than one classification process often apply the different classification processes in a predefined order, and do not allow for user input during the classification process. When these known systems fail to produce a desired output, it is difficult for a user to determine at which point the process failed (e.g., a first pixel-level classification, a second pixel-level classification, etc.).

Accordingly, there is a need for classification systems that provide seamless integration of multiple image classification processes along with user input.

BRIEF DESCRIPTION

In one aspect, a method for inspecting features of an image using an image inspection controller that includes a processor communicatively coupled to a memory is described. The method includes receiving, at the processor, an input image, performing, on the input image, one of a semantic segmentation process and an object classification process to generate an output image, and prompting a user to select between approving the displayed output image, and at least one of i) performing an additional semantic segmentation process on the displayed output image, and ii) performing an additional object classification process on the displayed output image. The semantic segmentation process includes annotating, by the processor, at least one segment of the input image to produce a semantic segmentation annotated image and generating, by the processor, a semantic segmentation model based on a semantic segmentation training vector derived from the semantic segmentation annotated image. The semantic segmentation process also includes applying, by the processor, the semantic segmentation model to each pixel of the input image to generate the output image and displaying the output image. The object classification process includes annotating, by the processor, at least one object in an object mask to produce an object classification annotated image and generating, by the processor, an object classification model based on an object classification training vector derived from the object classification annotated image. The object classification process also includes applying, by the processor, the object classification model to the object mask to generate the output image and displaying the output image.

In another aspect an image inspection computing device including a memory device and at least one processor communicatively coupled to the memory device is described. The at least one processor is configured to receive an input image, perform, on the input image, one of a semantic segmentation process and an object classification process to generate an output image, and prompt a user to select between approving the displayed output image, and at least one of i) performing an additional semantic segmentation process on the displayed output image, and ii) performing an additional object classification process on the displayed output image. The semantic segmentation process includes annotating, by the processor, at least one segment of the input image to produce a semantic segmentation annotated image and generating, by the processor, a semantic segmentation model based on a semantic segmentation training vector derived from the semantic segmentation annotated image. The semantic segmentation process also includes applying, by the processor, the semantic segmentation model to each pixel of the input image to generate the output image and displaying the output image. The object classification process includes annotating, by the processor, at least one object in an object mask to produce an object classification annotated image and generating, by the processor, an object classification model based on an object classification training vector derived from the object classification annotated image. The object classification process also includes applying, by the processor, the object classification model to the object mask to generate the output image and displaying the output image.

In yet another aspect a non-transitory computer-readable storage media having computer-executable instructions embodied thereon is described. When executed by a computing device including at least one processor in communication with a memory, the computer-executable instructions cause the computing device to receive, at the processor, an input image, perform, on the input image, one of a semantic segmentation process and an object classification process to generate an output image, and prompt a user to select between approving the displayed output image, and at least one of i) performing an additional semantic segmentation process on the displayed output image, and ii) performing an additional object classification process on the displayed output image. The semantic segmentation process includes annotating, by the processor, at least one segment of the input image to produce a semantic segmentation annotated image and generating, by the processor, a semantic segmentation model based on a semantic segmentation training vector derived from the semantic segmentation annotated image. The semantic segmentation process also includes applying, by the processor, the semantic segmentation model to each pixel of the input image to generate the output image and displaying the output image. The object classification process includes annotating, by the processor, at least one object in an object mask to produce an object classification annotated image and generating, by the processor, an object classification model based on an object classification training vector derived from the object classification annotated image. The object classification process also includes applying, by the processor, the object classification model to the object mask to generate the output image and displaying the output image.

DETAILED DESCRIPTION

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Described herein are systems and methods for image classification. These systems and methods classify images using one or more of a semantic segmentation process and an object classification process, based on user input received throughout the process. These systems and methods allow a user to customize the image classification process, annotate images/masks, and determine next steps to be taken in the image classification process. The output of the systems and methods described herein is a generated output image with specificity in many aspects including texture, intensity, and geometry of objects in an image. The output image is generated by implementing semantic segmentation and/or object classification with user input to train a model in a supervised machine learning approach to learn desired foreground and background objects. In the example embodiment, a mask/output image (e.g., semantic segmentation mask or object classification mask) is shown to a user after each classification process until the user indicates the mask is acceptable. If the mask is unacceptable, the user can indicate what the next step in the process should be (i.e., resulting in an iterative process). In some embodiments, acceptability of the image/mask is determined automatically, and does not require a user indication.

The technical problems addressed by the disclosure include at least one of: (a) some current image inspection systems use only one image inspection approach; (b) some current image inspection systems use different image inspection approaches but utilize deep convolutional neural networks that require significant training examples and computing resources; (c) some current image inspection systems are not flexible and utilize predetermined canned/customized algorithms; and (d) some current image inspection systems use different image inspection approaches at different levels (i.e., at the same time), but not in an iterative approach.

The technical effects achieved by the systems and methods described herein include at least one of: (a) receiving, at the processor, an input image; (b) performing, on the input image, one of a semantic segmentation process and an object classification process to generate an output image; and (c) prompting a user to select between approving the displayed output image, and at least one of i) performing an additional semantic segmentation process on the displayed output image, and ii) performing an additional object classification process on the displayed output image.

The resulting technical benefits achieved by the systems and methods of the disclosure include at least one of: (a) utilizing different image inspection approaches to generate a more detailed output image; (b) utilizing traditional machine learning techniques that can be used with limited training data and/or computing resources; (c) providing a generic image inspection approach that can implement any type/number of pixel-level and object-level features and can be applied on any semantic image segmentation application; and (d) providing the option for image inspection to include an iterative process wherein multiple image inspection processes (e.g., semantic segmentation and object classification) are used to train models and fine-tune each other.

Figure 1:
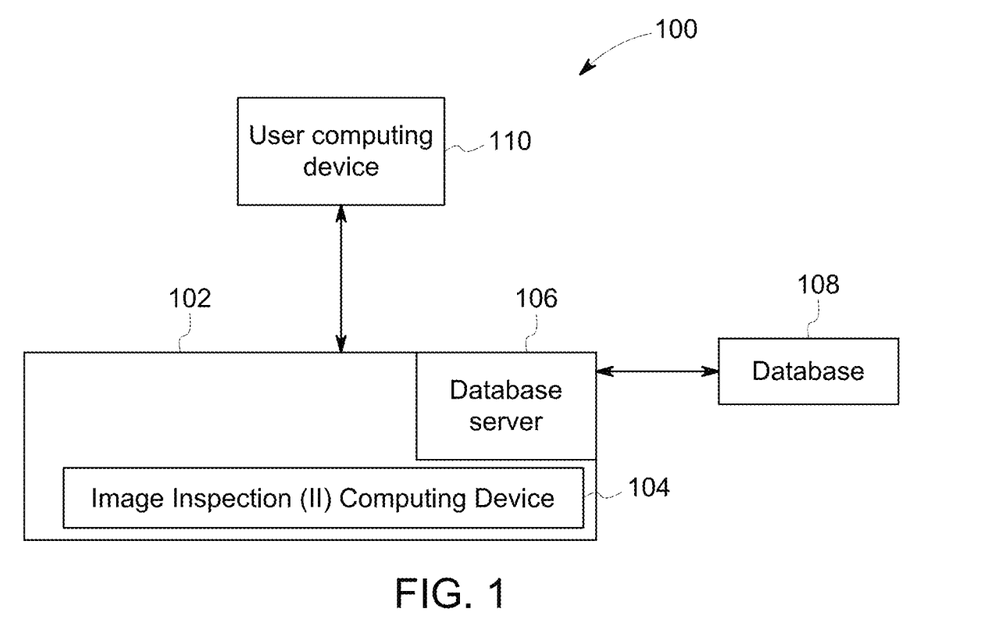
FIG. 1 is a schematic diagram illustrating an example image inspection (II) computing system.

FIG. 1 is a schematic diagram illustrating an example image inspection (II) computing system 100 for classifying objects in an image.

II computing system 100 includes a server 102, including at least one II computing device 104 and a database server 106, wherein II computing device 104 (also referred to herein as an image inspection controller) is in communication with at least one database 108 and at least one user computing device 110.

Figure 2A:
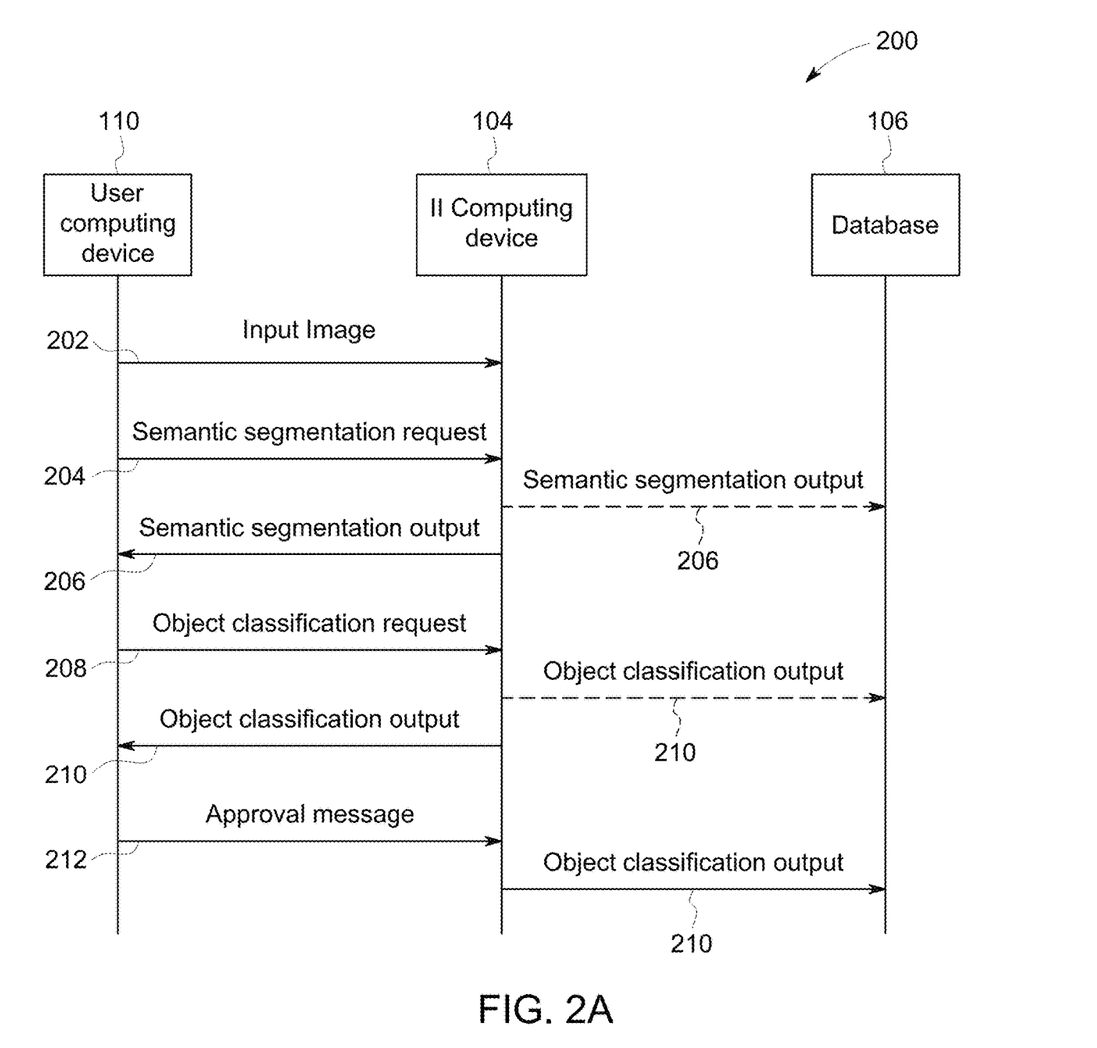
FIG. 2A is a diagram of an example data flow illustrating image classification, as implemented using the II computing system shown in FIG. 1.

In the example embodiment, user computing device 110 (e.g., a smartphone, tablet, laptop, etc.) is configured to transmit signals/messages to II computing device 104, such as an input image 202 and an approval message 212 (shown in FIG. 2A). User computing device 110 is also configured to receive outputs from II computing device 104, such as a semantic segmentation output 206 and an object classification output 210 (also shown in FIG. 2A).

Database server 106 may be in communication with database 108, which contains information on a variety of matters, as described below in greater detail. In one embodiment, database 108 is stored on server 102 and may be accessed by logging onto server 102 and/or II computing device 104 through user computing device 110. In another embodiment, database 108 may be stored remotely from server 102 and may be non-centralized. In some embodiments, database 108 may be distributed across a plurality of locations (e.g., server 102, database 108, etc.), and/or exist in a cloud environment. However, the embodiments of the systems and methods described herein are not limited to cloud-based embodiments. The example embodiment is not cloud-based, particularly because cloud-based deployment can increase data privacy concerns, and upload latency and lack of flexibility in budget can potentially be prohibitive.

In the example embodiment, II computing device 104 is configured to inspect images to identify objects by utilizing machine learning techniques in combination with at least one of a semantic segmentation process, an object classification process, and user input/annotation.

FIG. 2A is a diagram of an example data flow 200 illustrating classifying objects in an image, as implemented using II computing system 100 shown in FIG. 1.

In the example embodiment, II computing device 104 is configured to receive an input image 202 from user computing device 110. A user associated with user computing device 110 may also select a first process to be performed on input image 202. For example, a user may select one of a semantic segmentation process or object classification process be performed initially on input image 202. In the example shown in FIG. 2A, a user has requested, at user computing device 110, a semantic segmentation process be performed on input image 202. Accordingly, a semantic segmentation request 204 is transmitted from user computing device 110 to II computing device 104.

Figure 2B:
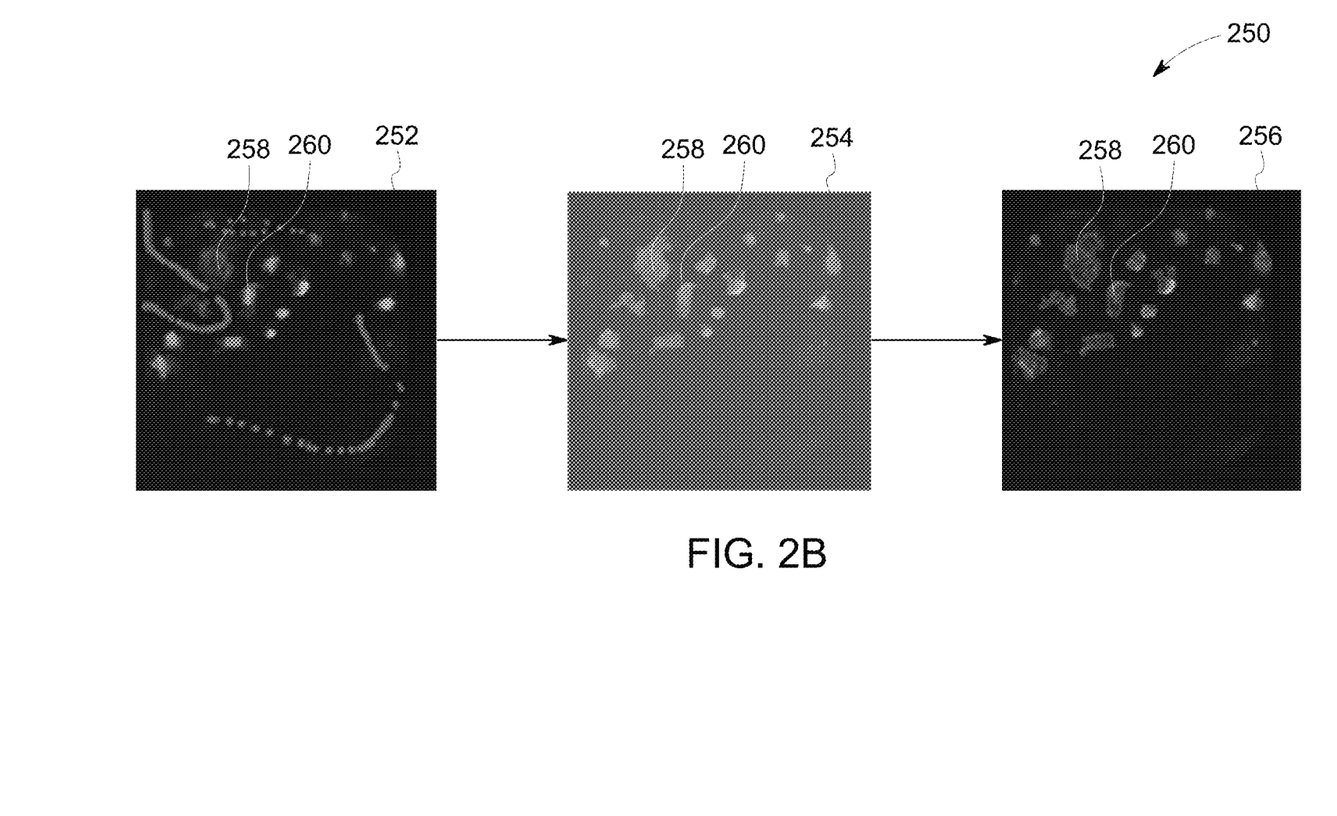
FIG. 2B is a diagram of an example semantic segmentation process, as implemented using the II computing system shown in FIG. 1.

FIG. 2B is a diagram of an example semantic segmentation process 250, as implemented using II computing system 100.

Upon selection of a semantic segmentation process or object classification process, a user can manually annotate input image 202. For example, a semantic segmentation annotated image 252 is shown in FIG. 2B. Semantic segmentation annotated image 252 may be included in semantic segmentation request 204. Multiple objects are shown in semantic segmentation annotated image 252, two of which are labeled as object 258 and object 260. In the example shown in FIG. 2A, object 258 is an example of an object that should be designated as background, and object 260 is an example of an object that should be designated as foreground.

A user, on a graphical user interface at user computing device 110, can annotate image 252 to train a model as to which objects should be assigned to the background and which objects should be assigned to the foreground. In the example shown in image 252, object 260 is an object that has been annotated (in a light color) to teach the model that object 260 is an example of an object that should be assigned to the foreground. In some embodiments, a user may also annotate, in a different color for example, objects that should be assigned to the background. In some embodiments, an input image may not be annotated. In other embodiments, annotations may be made in any format (i.e., other than different colors). In further embodiments, an input image may be annotated automatically by II computing device 104 (e.g., using machine learning techniques).

Based on annotated image 252, II computing device 104 is configured to generate a training vector that helps it determine which objects should be marked as foreground and which should be marked as background, and uses the generated training vector to further generate a model. The generated model is then used by II computing device 104 in a semantic segmentation process such that the model is applied to each pixel in input image 202 to determine which objects should be in the foreground and/or background. Accordingly, a semantic segmentation mask 254 is generated by II computing device 104.

Upon generating semantic segmentation mask 254, II computing device 104 is configured to generate an output, such as semantic segmentation output 206. In some embodiments, semantic segmentation output 206 may be a semantic segmentation mask such as semantic segmentation mask 254. In other embodiments, semantic segmentation output 206 may be an object classification mask 256 extracted from semantic segmentation mask 254. Object classification mask 256 indicates objects determined to be in the foreground in the semantic segmentation mask, such as object 260, at the object level instead of the pixel level.

In the example embodiment, semantic segmentation output 206 includes object classification mask 256, and is transmitted from II computing device 110. In some embodiments, object classification mask 256 may also be transmitted to database 106 for storage therein. In some embodiments, II computing device 110 is configured to convert an object classification mask to a semantic segmentation mask. In some embodiments, II computing device 110 is configured to convert a semantic segmentation mask to an object classification mask.

Upon receipt of semantic segmentation output 206 at user computing device 110, a user associated with user computing device 110 can accept or reject the output 206 as a final output image. If a user accepts output 206 as a final output image, output 206 is transmitted to database 106 for storage as the final output image. However, if the user rejects output 206, the user is presented at user computing device 110 with options to initiate at least one of a semantic segmentation process or object classification process. If the user initiates a semantic segmentation process, a semantic segmentation process as described above is then performed. Again, before transmitting a second semantic segmentation request, a user has the option to annotate the image (i.e., output 206 in this scenario), to help further train the model and correct any errors from the first semantic segmentation process. In some embodiments, II computing device 104 automatically determines whether or not output 206 is accepted or rejected. If output 206 is automatically rejected, II computing device 104 may automatically initiate one of a semantic segmentation or object classification process. In some embodiments, II computing device may transmit a message to user computing device 110 giving the user associated the option to select which process should be initiated next.

In one example, the user rejects output 206 and initiates an object classification process. Accordingly, an object classification request 208 is transmitted from user computing device 110 to II computing device 104.

Figure 2C:
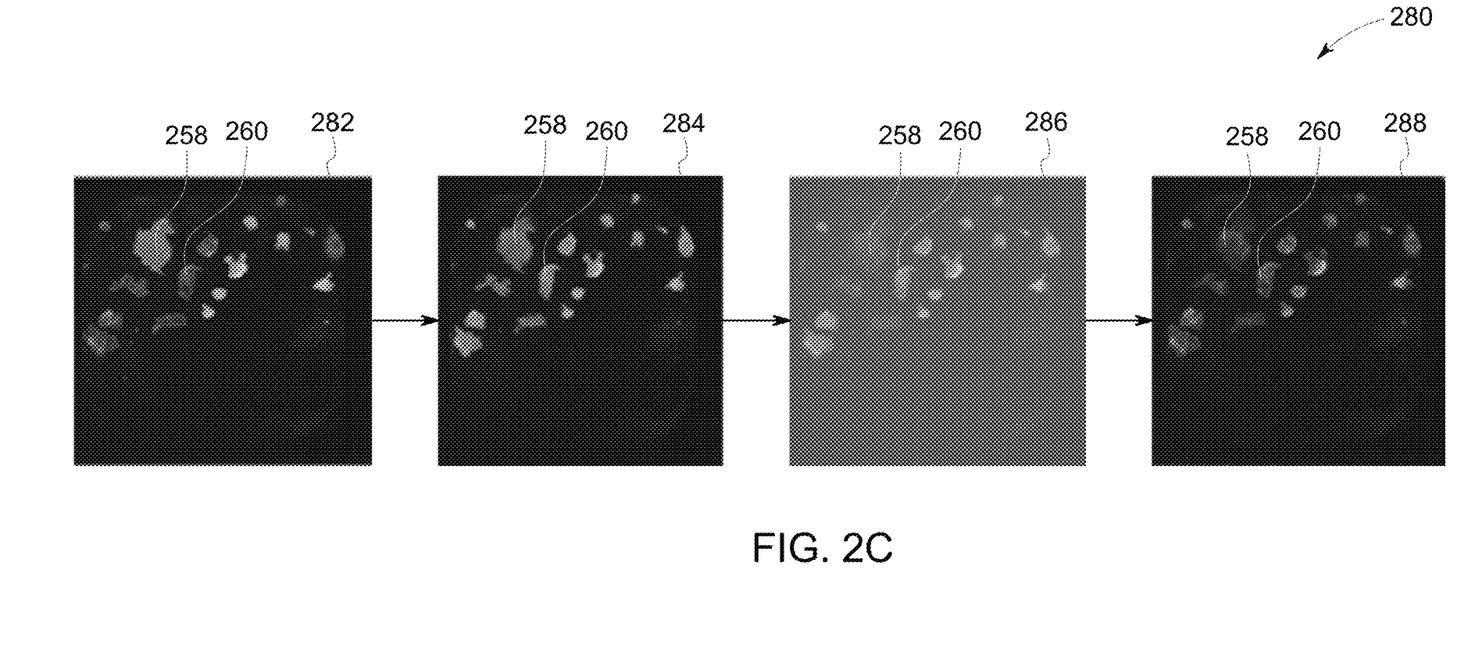
FIG. 2C is a diagram of an example object classification process, as implemented using the II computing system shown in FIG. 1.

FIG. 2C is a diagram of an example object classification process 280, as implemented using II computing system 100. Object classification request 208 may include an annotated object mask 282, for example, to further train a model as to which objects should be assigned to the background and which objects should be assigned to the foreground. In the example shown in image/annotated object mask 282, object 258 has been annotated in a darker color to indicate that it should be assigned to the background and was incorrectly assigned to the foreground during semantic segmentation process 250. In any of the annotations described herein, any number of objects may be annotated to indicate they belong in the foreground or background. Annotating more objects may lead to greater detail being used in the model and thus better accuracy in an output image generated by II computing device 104. As was described above with respect to semantic segmentation process 250, a user may annotate any number of objects, and in some embodiments objects may be annotated automatically by II computing device 104 (e.g., using machine learning techniques).

II computing device 104 is configured to generate an object classification mask 284 from annotated object classification mask 282. To generate object classification mask 284, II computing device 104 is configured to generate an object classification training vector based at least on the annotations made in annotated object classification mask 282. The training vector is then used to generate an object classification model that is then applied to semantic segmentation output 206 to generate object classification mask 284. The model is used by II computing device 104 to identify objects that belong in the foreground and objects that belong in the background. Because the model learned from the annotation of object 258, other objects similar to object 258 are identified in object mask 284 as belonging in the background despite previously being identified as objects belonging in the foreground.

Upon generating object classification mask 284, II computing device 104 is configured to generate an output, such as object classification output 210. In some embodiments, object classification output 210 may be an object classification mask such as object classification mask 284. In other embodiments, object classification output 210 may be a semantic segmentation mask 286 generated from object classification mask 284. In yet further embodiments object classification output 210 may be an image 288 indicating objects of interest (i.e., in the foreground) separate from an object mask or segmentation mask, and generated by II computing device 104 from either an object mask or a segmentation mask.

Upon receipt of object classification output 210 at user computing device 110, a user associated with user computing device 110 can accept or reject the output 210 as a final output image. If the user rejects output 210, the user is presented at user computing device 110 with options to initiate at least one of a semantic segmentation process or object classification process. If a user initiates a semantic segmentation process, a semantic segmentation process as described above is then performed to produce an updated output image. If a user initiates an object classification process, an object classification process as described above is then performed to produce an updated output image. Before transmitting a segmentation request or classification request, the user has the option to annotate the image, this time being output 210, to help further train the model and correct any errors from the first semantic segmentation process. In some embodiments, II computing device 104 automatically determines whether or not output 210 is accepted or rejected. If output 210 is automatically rejected, II computing device 104 may automatically initiate one of a semantic segmentation or object classification process. In some embodiments, II computing device 104 may transmit a message to user computing device 110 giving the user the option to select which process should be initiated.

In the example embodiment shown in FIG. 2A, a user indicates object classification output 210 is accurate regarding which objects are in the foreground and which objects are in the background. Accordingly, an approval message 212 is transmitted from user computing device 110 to II computing device 104, and object classification output 210 is transmitted from II computing device 104 to database 106 for storage as a final image.

Although the example shown in FIGS. 2A-2C demonstrates a semantic segmentation process followed by an object classification process, any combination of semantic segmentation processes, object classification processes, or other image inspection processes may be performed in any order based on user input and/or determinations made by II computing device 104 to generate a final image. Accordingly, in some embodiments only one such process may be performed, and in other embodiments an iterative process of the processes described herein may be performed. Thus, a main advantage is the flexibility of the systems and methods described herein, and the relatively low amount of computing resources needed to complete the processes described herein in real-time without requiring extensive training data and/or use of deep convolutional neural networks.

Figure 3:
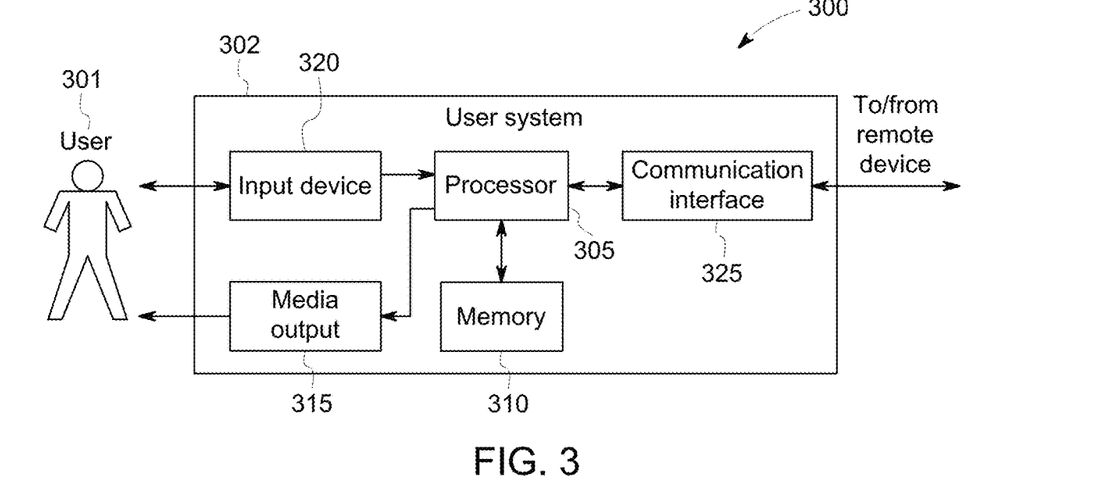
FIG. 3 is a block diagram of an example user computing device that may be used in the II computing system shown in FIG. 1.

FIG. 3 illustrates an example configuration of a user system 302 that may be operated by a user 301. In the example embodiment, user system 302 is similar to user computing device 110 (shown in FIG. 1), and may be used by user 301 to interact with II computing device 104 (also shown in FIG. 1). More specifically, user system 302 may be used by user 301 to, for example, transmit messages such as an input image 202 and/or receive a message such as semantic segmentation output 206 and object classification output 210 (both shown in FIG. 2A). In the example embodiment, user system 302 includes a processor 305 for executing instructions. In some embodiments, executable instructions are stored in a memory area 310. Processor 305 may include one or more processing units, for example, a multi-core configuration. Memory area 310 may include one or more computer readable media.

User system 302 also includes at least one media output component 315 for presenting information to user 301, such as for example, object classification output 210. Media output component 315 is any component capable of conveying information to user 301. In some embodiments, media output component includes an output adapter such as a video adapter and/or audio adapter. An output adapter is operatively coupled to processor 305 and operatively couplable to an output device such as a display device, a liquid crystal display (LCD), organic light emitting diode (OLED) display, or "electronic ink" display, or an audio output device, a speaker or headphones.

In some embodiments, user system 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 315 and input device 320. For example, input device 320 of user system 302 may be used by a user thereof to annotate an image. User system 302 may also include a communication interface 325, which is communicatively couplable to a remote device, such as II computing device 104. Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 310 are, for example, computer readable instructions for providing a user interface to user 301 via media output component 315 and, optionally, receiving and processing input from input device 320. A user interface may include, among other possibilities, a web browser and client application. Web browsers enable users, such as user 301, to display and interact with media and other information typically embedded on a web page or a website from II computing system 100.

Figure 4:
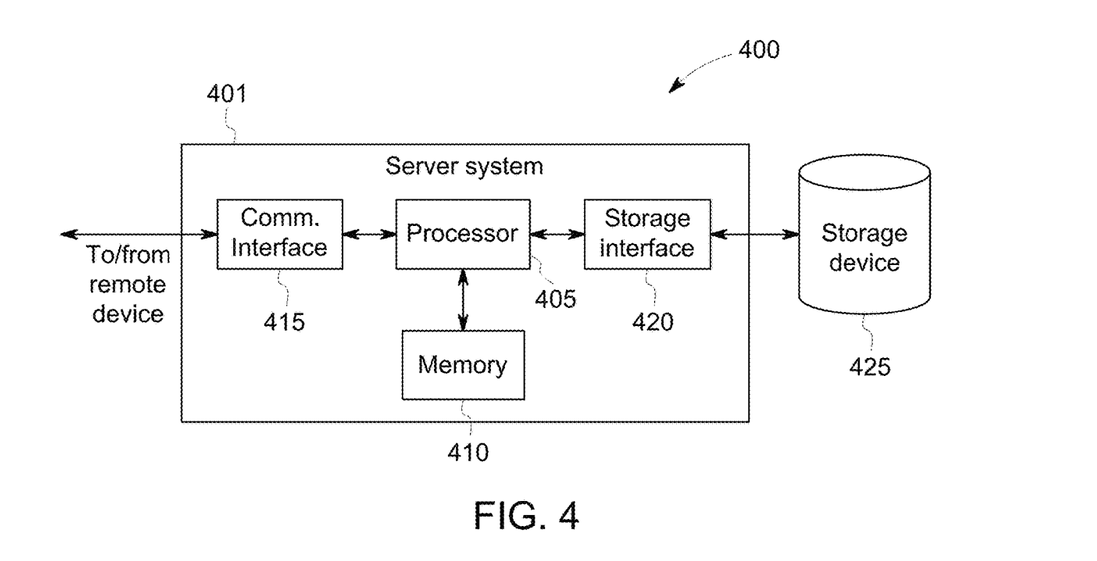
FIG. 4 is a block diagram of an example server computing system that may be used in the II computing system shown in FIG. 1.

FIG. 4 illustrates an example configuration of a server system 401. Server system 401 may include, but is not limited to, II computing device 104 (shown in FIG. 1). Server system 401 includes a processor 405 for executing instructions. Instructions may be stored in memory area 410, for example. Processor 405 may include one or more processing units (e.g., in a multi-core configuration) for executing instructions. The instructions may be executed within a variety of different operating systems on server system 401, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 405 is operatively coupled to a communication interface 415 such that server system 401 is capable of communicating with a remote device such as user system 302 (shown in FIG. 3) or another server system 401. For example, communication interface 415 may receive requests from user computing device 110 via the Internet.

Processor 405 may also be operatively coupled to a storage device 425. Storage device 425 is any computer-operated hardware suitable for storing and/or retrieving data. In some embodiments, storage device 425 is integrated in server system 401. For example, server system 401 may include one or more hard disk drives as storage device 425. In other embodiments, storage device 425 is external to server system 401 and may be accessed by a plurality of server systems 401. For example, storage device 425 may include multiple storage units such as hard disks or solid state disks in a redundant array of inexpensive disks (RAID) configuration. Storage device 425 may include a storage area network (SAN) and/or a network attached storage (NAS) system.

In some embodiments, processor 405 is operatively coupled to storage device 425 via a storage interface 420. Storage interface 420 is any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Memory area 410 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5A:
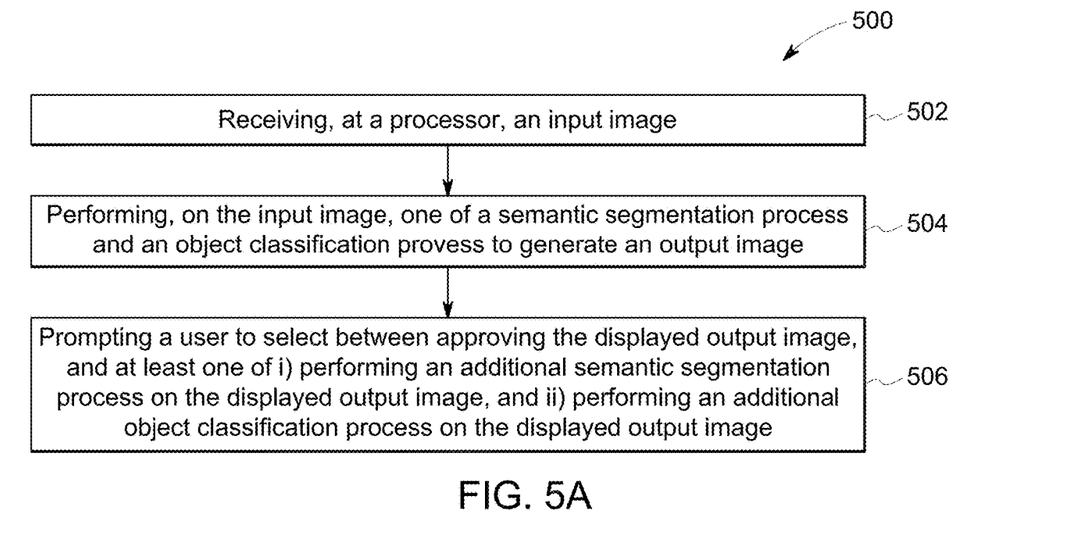
FIG. 5A is a flow diagram of an example method for classifying images in accordance with the present disclosure.

FIG. 5A is a flow diagram of an example method 500 for classifying images in accordance with the present disclosure.

Method 500 includes receiving 502, at a processor, an input image (e.g., input image 202) and performing 504, on the input image, one of a semantic segmentation process (e.g., semantic segmentation process 520) and an object classification process (e.g., object classification process 540) to generate an output image (e.g., object classification output 210). Method 500 further includes prompting 506 a user to select between approving the displayed output image, and at least one of i) performing an additional semantic segmentation process on the displayed output image, and ii) performing an additional object classification process on the displayed output image.

In some embodiments, method 500 includes receiving user input (e.g., from user computing device 110) indicating a selection of performing the additional semantic segmentation process on the displayed output image, performing the additional semantic segmentation process on the displayed output image to generate and display an updated output image, and prompting the user to select between approving the displayed updated output image, and at least one of i) performing a further semantic segmentation process on the displayed updated output image, and ii) performing a further object classification process on the displayed updated output image.

In some embodiments, method 500 includes receiving user input indicating a selection of performing the additional object classification process on the displayed output image, performing the additional object classification process on the displayed output image to generate and display an updated output image, and prompting the user to select between approving the displayed updated output image, and at least one of i) performing a further semantic segmentation process on the displayed updated output image, and ii) performing a further object classification process on the displayed updated output image.

Figure 5B:
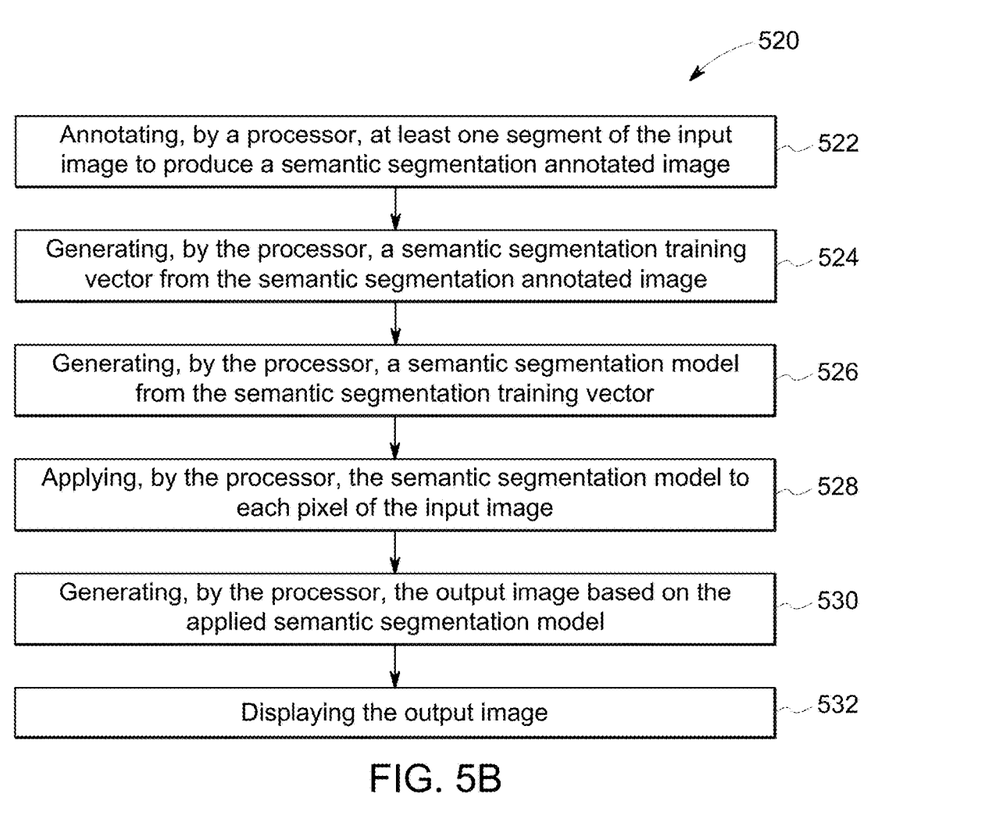
FIG. 5B is a flow diagram of an example semantic segmentation process in accordance with the present disclosure.

FIG. 5B is a flow diagram of an example semantic segmentation process 520 in accordance with the present disclosure.

Semantic segmentation process 520 includes annotating 522, by a processor, at least one segment of the input image to produce a semantic segmentation annotated image, generating 524, by the processor, a semantic segmentation training vector from the semantic segmentation annotated image, and generating 526, by the processor, a semantic segmentation model from the semantic segmentation training vector. Semantic segmentation process 520 also includes applying 528, by the processor, the semantic segmentation model to each pixel of the input image, generating 530, by the processor, the output image based on the applied semantic segmentation model, and displaying 532 the output image. In some embodiments annotating 522 at least one segment of the input image includes annotating the input image based on user input on a graphical user interface displayed on a display device (e.g., user computing device 110) communicatively coupled to the processor.

Figure 5C:
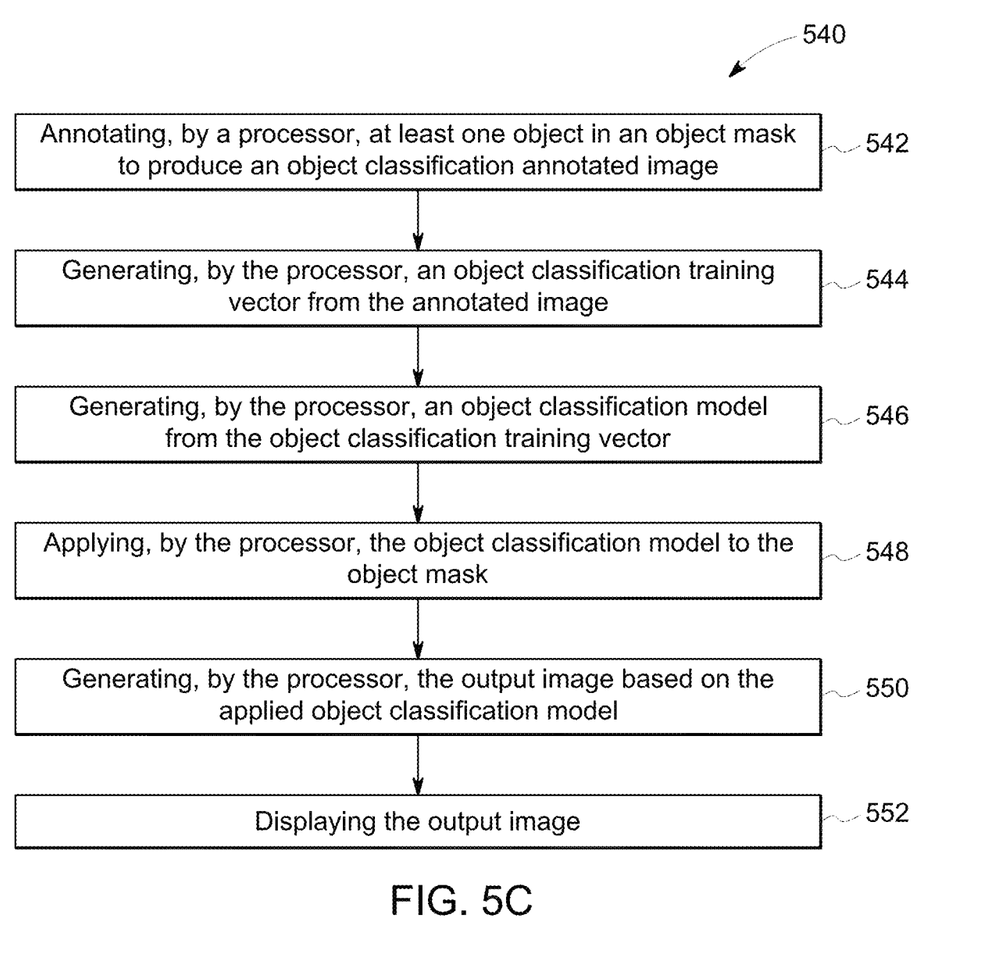
FIG. 5C is a flow diagram of an example object classification process in accordance with the present disclosure.

FIG. 5C is a flow diagram of an example object classification process 540 in accordance with the present disclosure.

Object classification process 540 includes annotating 542, by the processor, at least one object in an object mask to produce an object classification annotated image, generating 544, by the processor, an object classification training vector from the annotated image, and generating 546, by the processor, an object classification model from the object classification training vector. Object classification process 540 also includes applying 548, by the processor, the object classification model to the object mask, generating 550, by the processor, the output image based on the applied object classification model, and displaying 552 the output image. In some embodiments annotating 542 at least one object in an object mask includes annotating the object mask based on user input on a graphical user interface displayed on a display device (e.g., user computing device 110) communicatively coupled to the processor.

Figure 6:
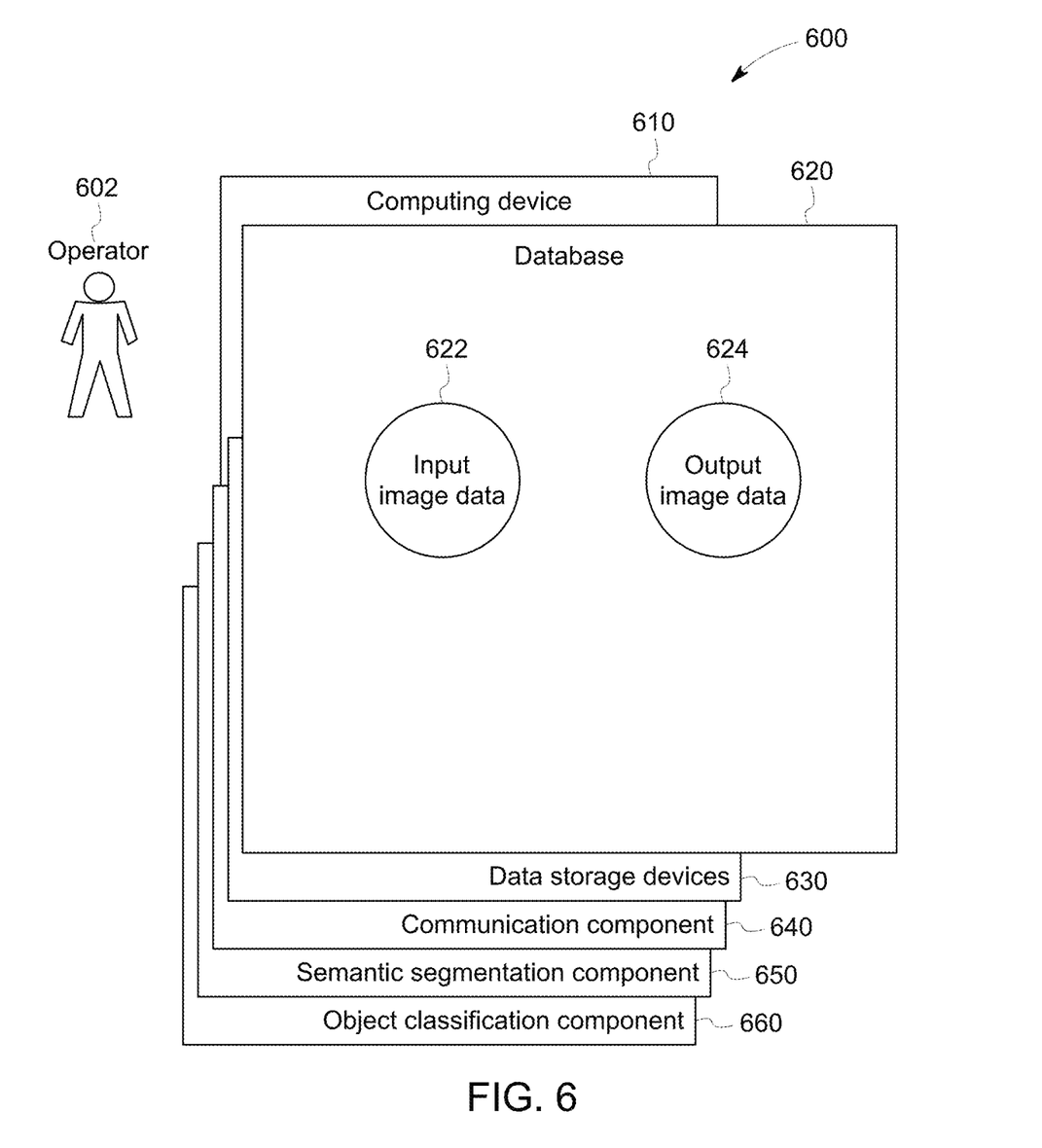
FIG. 6 is a diagram of components of one or more example computing devices that may be used in the II computing system shown in FIG. 1.

FIG. 6 is a diagram 600 of components of one or more example computing devices that may be used in II computing system 100 shown in FIG. 1. In some embodiments, computing device 610 may be used to implement II computing device 104. The computer components may be used to, for example, perform 504 one of a semantic segmentation process and an object classification process (shown in FIG. 5). An operator 602 (such as a user operating II computing device 104) may access computing device 610 in order to initiate various operations and/or service computing device 610. In some embodiments, database 620 is similar to database 108, as shown in FIG. 1. Database 620 may be implemented on one or more data storage devices 630 and coupled with several components within computing device 610, which perform specific tasks. In the example embodiment, database 620 includes input image data 622 and output image data 624.

In the example embodiment, computing device 610 includes a communication component 640 programmed to, for example, receive 502 an input image (as shown in FIG. 5A) and transmit an output image.

In the example embodiment, computing device 610 further includes a semantic segmentation component 650 configured to, for example, perform a semantic segmentation process (e.g., semantic segmentation process 520). Further in the example embodiment, computing device 610 includes an object classification component 660 configured to, for example, perform an object classification process (e.g., object classification process 540).

Exemplary embodiments of systems and methods for classifying objects in an image are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing data, and classifying objects.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle Database, MySQL, IBM DB2, Microsoft SQL Server, Sybase, and PostgreSQL. However, any database implementation (e.g., relational, document-based) may be used that enables the system and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California).

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for inspecting features of an image by a computing device using an image inspection controller that includes a processor communicatively coupled to a memory, said method comprising:
   receiving, at the processor, an input image;
   performing, on the input image, one of a semantic segmentation process and an object classification process to generate an output image;
   wherein the semantic segmentation process comprises:
   annotating, by the processor, at least one segment of the input image to produce a semantic segmentation annotated image;
   generating, by the processor, a semantic segmentation model based on a semantic segmentation training vector derived from the semantic segmentation annotated image; and
   applying, by the processor, the semantic segmentation model to each pixel of the input image to generate the output image; and
   wherein the object classification process comprises:
   annotating, by the processor, at least one object in an object mask to produce an object classification annotated image;
   generating, by the processor, an object classification model based on an object classification training vector derived from the object classification annotated image;
   applying, by the processor, the object classification model to the object mask to generate the output image; and
   automatically determining by the computing device whether the output image is acceptable or unacceptable, and upon determining that the output image is unacceptable automatically initiating one of: i) an additional semantic segmentation process on the output image, and ii) an additional object classification process on the output image.

2. The method in accordance with claim 1, wherein a selection of performing the additional semantic segmentation process on the output image is performed by the processor employing artificial intelligence.

3. The method in accordance with claim 2, further comprising performing the additional semantic segmentation process on the output image, the additional semantic segmentation process comprising generating an updated output image.

4. The method in accordance with claim 3, further comprising the processor transmitting a message to the user computing device giving a user an option to select whether to perform i) a further semantic segmentation process on the updated output image, and ii) a further object classification process on the updated output image.

5. The method in accordance with claim 4, further comprising receiving user input indicating a selection of performing the additional object classification process on the output image.

6. The method in accordance with claim 5, further comprising performing the additional object classification process on the output image, the additional object classification process comprising generating and displaying an updated output image.

7. The method in accordance with claim 6, further comprising selecting, by the processor, between approving the updated output image, and performing at least one of i) a further semantic segmentation process on the updated output image, and ii) a further object classification process on the updated output image.

8. The method in accordance with claim 1, wherein annotating at least one segment of the input image or annotating at least one object in the object mask comprises annotating the at least one object automatically by the computing device.

9. An image inspection computing device comprising:
a memory device; and
at least one processor communicatively coupled to said memory device, wherein said at least one processor is configured to:
receive an input image;
perform, on the input image, one of a semantic segmentation process and an object classification process to generate an output image;
wherein the semantic segmentation process comprises:
annotating, by the processor, at least one segment of the input image to produce a semantic segmentation annotated image;
generating, by the processor, a semantic segmentation model based on a semantic segmentation training vector derived from the semantic segmentation annotated image; and
applying, by the processor, the semantic segmentation model to each pixel of the input image to generate the output image; and
wherein the object classification process comprises:
annotating, by the processor, at least one object in an object mask to produce an object classification annotated image;
generating, by the processor, an object classification model based on an object classification training vector derived from the object classification annotated image;
applying, by the processor, the object classification model to the object mask to generate the output image; and
automatically determining by the computing device whether the output image is acceptable or unacceptable, and upon determining that the output image is unacceptable automatically initiating one of: i) an additional semantic segmentation process on the output image, and ii) an additional object classification process on the output image.

10. The image inspection computing device in accordance with claim 9, wherein said processor is further configured to perform the additional semantic segmentation process.

11. The image inspection computing device in accordance with claim 10, wherein said processor is further configured to perform the additional semantic segmentation process on the output image, the additional semantic segmentation process including generating an updated output image.

12. The image inspection computing device in accordance with claim 11, wherein said processor is further configured to transmit a message to the user computing device giving a user an option to select whether to perform i) performing a further semantic segmentation process on the updated output image, and ii) a further object classification process on the updated output image.

13. The image inspection computing device in accordance with claim 12, wherein said processor is further configured to receive user input indicating a selection of performing the additional object classification process on the output image.

14. The image inspection computing device in accordance with claim 13, wherein said processor is further configured to perform the additional object classification process on the output image, the additional object classification process including generating an updated revised output image.

15. The image inspection computing device in accordance with claim 14, wherein said processor is further configured to select between approving the updated output image, and at least one of i) performing a further semantic segmentation process on the updated output image, and ii) performing a further object classification process on the updated output image.

16. The image inspection computing device in accordance with claim 9, wherein to annotate at least one segment of the input image or to annotate at least one object in the object mask, said processor is configured to annotate the input image or the object mask, based on user input, on a graphical user interface displayed on a display device communicatively coupled to said processor.

17. A non-transitory computer-readable storage media having computer-executable instructions embodied thereon, wherein when executed by a computing device comprising at least one processor in communication with a memory, the computer-executable instructions cause the computing device to:
receive, at the processor, an input image;
perform, on the input image, one of a semantic segmentation process and an object classification process to generate an output image;
wherein the semantic segmentation process comprises:
annotating, by the processor, at least one segment of the input image to produce a semantic segmentation annotated image;
generating, by the processor, a semantic segmentation model based on a semantic segmentation training vector derived from the semantic segmentation annotated image; and
applying, by the processor, the semantic segmentation model to each pixel of the input image to generate the output image; and
wherein the object classification process comprises:
annotating, by the processor, at least one object in an object mask to produce an object classification annotated image;
generating, by the processor, an object classification model based on an object classification training vector derived from the object classification annotated image;
applying, by the processor, the object classification model to the object mask to generate the output image; and
automatically determining by the computing device whether the output image is acceptable or unacceptable, and upon determining that the output image is unacceptable automatically initiating one of: i) an additional semantic segmentation process on the output image, and ii) an additional object classification process on the output image.

18. The non-transitory computer-readable storage media in accordance with claim 17, wherein to annotate at least one segment of the input image, the computer-executable instructions cause the computing device to select performing the additional semantic segmentation process on the output image.

19. The non-transitory computer-readable storage media in accordance with claim 17, wherein the computer-executable instructions cause the computing device to convert the object mask to a semantic segmentation mask.

20. The non-transitory computer-readable storage media in accordance with claim 17, wherein the computer-executable instructions cause the computing device to convert a semantic segmentation mask to the object mask.

* * * * *